(12) United States Patent
Chen

(10) Patent No.: US 10,305,340 B2
(45) Date of Patent: May 28, 2019

(54) ARMATURE FOR PERMANENT MAGNET BRUSHED MOTOR

(71) Applicant: Chi-Wen Chen, New Taipei (TW)

(72) Inventor: Chi-Wen Chen, New Taipei (TW)

( * ) Notice: Subject to any disclaimer, the term of this patent is extended or adjusted under 35 U.S.C. 154(b) by 156 days.

(21) Appl. No.: 15/586,265

(22) Filed: May 3, 2017

(65) Prior Publication Data

US 2018/0323671 A1    Nov. 8, 2018

(51) Int. Cl.
*H02K 13/04* (2006.01)
*H02K 3/38* (2006.01)
*H01R 39/32* (2006.01)

(52) U.S. Cl.
CPC .............. *H02K 3/38* (2013.01); *H02K 13/04* (2013.01); *H01R 39/32* (2013.01); *H02K 2203/06* (2013.01)

(58) Field of Classification Search
CPC .......... H02K 13/04; H02K 23/26; H02K 3/51; H02K 3/527; H01R 39/32
See application file for complete search history.

(56) References Cited

U.S. PATENT DOCUMENTS

| 2,831,991 A | * | 4/1958 | Perkins | ............... | H02K 13/006 |
| | | | | | 29/598 |
| 3,697,792 A | * | 10/1972 | Roue | ..................... | H02K 13/04 |
| | | | | | 310/234 |
| 5,607,293 A | * | 3/1997 | Luedtke | ................ | F02M 37/08 |
| | | | | | 310/233 |

* cited by examiner

*Primary Examiner* — Dang D Le
(74) *Attorney, Agent, or Firm* — Leong C. Lei

(57) ABSTRACT

An armature for a permanent magnet brushed motor includes a shaft, a number of silicon steel laminations circumferentially around the shaft, a commutator adjacent to an end of the shaft, and an enameled wire winding wound around the silicon steel laminations and the commutator. A plastic sleeve capable of withstanding high temperature is disposed between the commutator and the silicon steel laminations and adjacent to the commutator. A plastic member wraps around where the enameled wire winding winds the commutator, and fixedly attaching to the plastic sleeve. As such, the plastic member establishes a first point of attachment at where the enameled wire winding winds the commutator and a second point of attachment to the plastic sleeve. The problem of the enameled wire winding being loosed or broken due to the armature's high-speed rotation is prevented, thereby enhancing the motor's robustness and operational life.

4 Claims, 2 Drawing Sheets ively around a middle section of the shaft 11. Two insulating sleeves 17 capable of withstanding high temperature are mounted to the two ends of the silicon steel laminations 12, respectively. A commutator 13 is configured adjacent to an end of the shaft 11. An enameled wire winding 14 is wound around the silicon steel laminations 12 and the commutator 13. A plastic sleeve 15 capable of withstanding high temperature is disposed between the commutator 13 and the silicon steel laminations 12. The armature 1 further includes a plastic member 16 wrapping around where the enameled wire winding 14 winds the commutator 13 and fixedly attaching to the plastic sleeve 15.

ARMATURE FOR PERMANENT MAGNET BRUSHED MOTOR

BACKGROUND OF THE INVENTION

(a) Technical Field of the Invention

The present invention generally relates to permanent magnet brushed motors and, more particularly, to an armature for permanent magnet brushed motors.

(b) Description of the Prior Art

In general, a motor operates as the electromechanical field from the coil wrapping the armature interacts with the magnetic field from the stator, thereby driving the armature to spin and converting electrical energy to mechanical energy.

The motor has already been widely applied to various appliances as a source of power such as electrical fan, compressor, air conditioner, etc.

For a permanent magnet brushed motor, as shown FIGS. 1 and 2, the armature A has a shaft A1 surrounded with silicon steel laminations A2. Insulating sleeves A3 are mounted to the two ends of the silicon steel laminations A2. A commutator A5 is configured to an end of the shaft A1. The silicon steel laminations A2 and the commutator A5 are wound by an enameled wire winding A4, and a plastic cover A6 made of such as epoxy resin is applied to where the enameled wire winding A5 winds the commutator A5 so that the enameled wire winding A5 is reliably connected to the commutator A5.

However, usually there is a large gap between the enameled wire winding A4 and the shaft A1, and the plastic cover A6 only covers the enameled wire winding A4's surface and does not permeate into the gap between the enameled wire winding A4 and the shaft A1. As such, due to the high-speed rotation of the armature A, the high temperature, and the constant shock from repeatedly starting and stopping the motor, the enameled wire winding A4 may become loosed or even broken, and the motor would never be able to function.

SUMMARY OF THE INVENTION

Therefore, a novel armature for a permanent magnet brushed motor is provided to obviate the above-described shortcoming. The armature includes a shaft, a number of silicon steel laminations circumferentially around the shaft, a commutator adjacent to an end of the shaft, and an enameled wire winding wound around the silicon steel laminations and the commutator. A plastic sleeve capable of withstanding high temperature is disposed between the commutator and the silicon steel laminations and adjacent to the commutator. A plastic member wraps around where the enameled wire winding winds the commutator, and fixedly attaching to the plastic sleeve.

The gist of the present invention lies in that, as such, the plastic member establishes a first point of attachment at where the enameled wire winding winds the commutator and a second point of attachment to the plastic sleeve. The plastic member, therefore, achieves two points of attachment and is reliably located at where the enameled wire winding 14 winds the commutator 13, forming a fixed locking structure. The problem of the enameled wire winding being loosed or broken due to the armature's high-speed rotation is prevented, thereby enhancing the motor's robustness and operational life.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings, identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
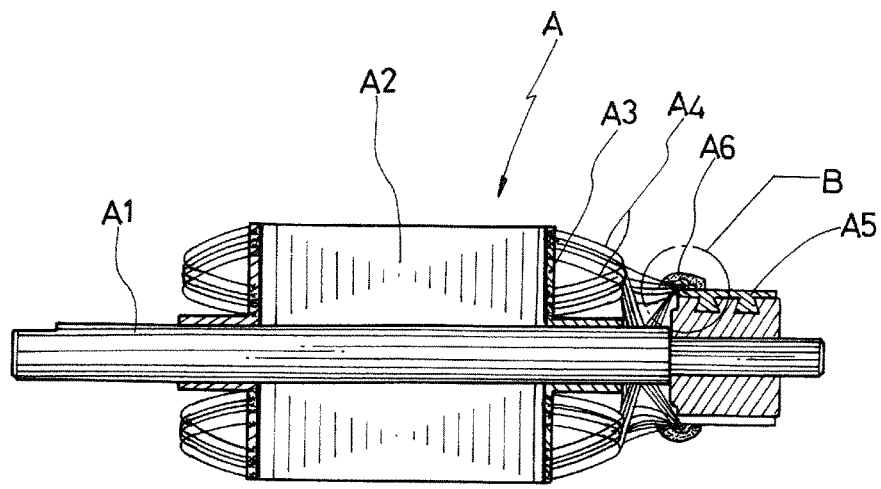
FIG. 1 is a schematic sectional diagram showing a conventional armature.
Figure 2:
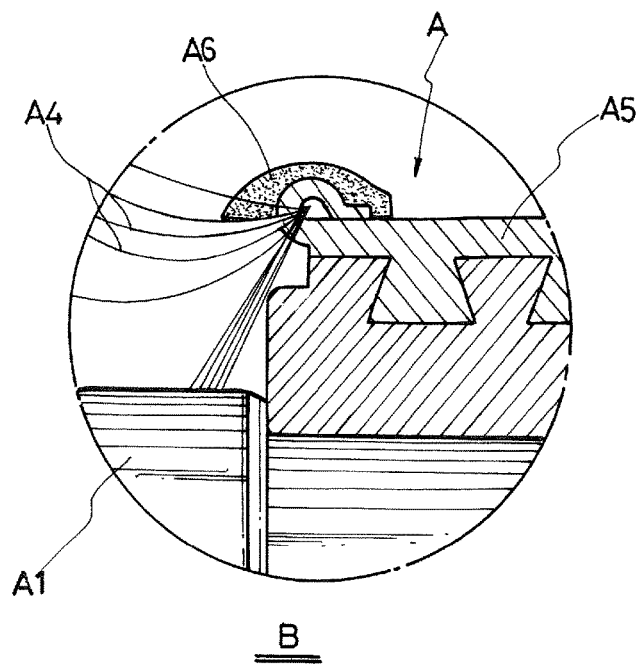
FIG. 2 is a schematic enlarged diagram showing an area B of the armature of FIG. 1.
Figure 3:
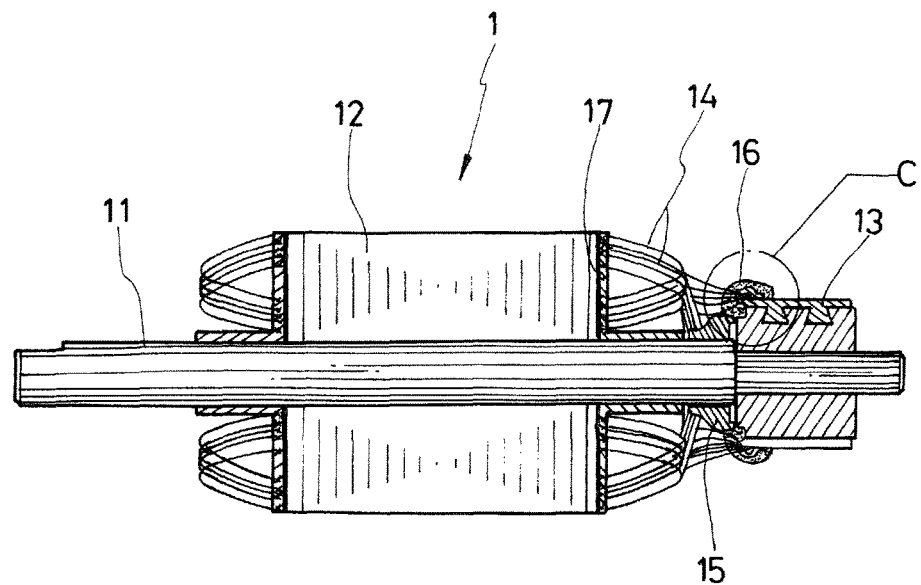
FIG. 3 is a schematic sectional diagram showing an armature according to an embodiment of the present invention.
Figure 4:
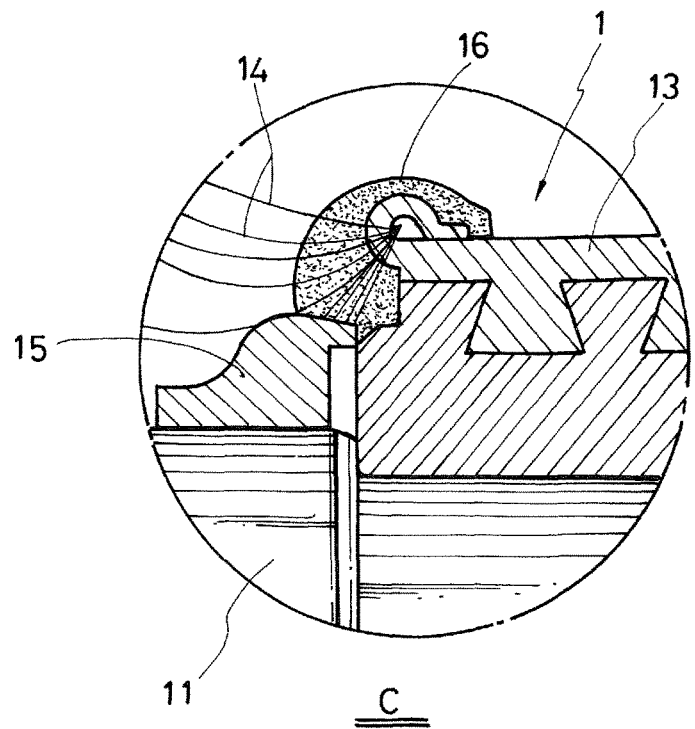
FIG. 4 is a schematic enlarged diagram showing an area C of the armature of FIG. 3.

As shown in FIGS. 3 and 4, the present invention teaches an armature 1 for permanent magnet brushed motor.

The armature 1 includes a shaft 11 and a number of silicon steel laminations 12 circumferentially around a middle section of the shaft 11. Two insulating sleeves 17 capable of withstanding high temperature are mounted to the two ends of the silicon steel laminations 12, respectively. A commutator 13 is configured adjacent to an end of the shaft 11. An enameled wire winding 14 is wound around the silicon steel laminations 12 and the commutator 13. A plastic sleeve 15 capable of withstanding high temperature is disposed between the commutator 13 and the silicon steel laminations 12. The armature 1 further includes a plastic member 16 wrapping around where the enameled wire winding 14 winds the commutator 13 and fixedly attaching to the plastic sleeve 15.

The plastic member 16 may be made of epoxy resin or silicone.

Please note that the plastic sleeve 15 is disposed adjacent to the commutator 13 and is opposite to the enameled wire winding 14. Then, the plastic member 16 covers where the enameled wire winding 14 winds the commutator 13, thereby establishing a first point of attachment for the plastic member 16. On the other hand, the plastic member 16 is also fixedly adhered to the plastic sleeve 15, thereby establishing a second point of attachment for the plastic member 16. The plastic member 16, therefore, achieves two points of attachment and as such is reliably located at where the enameled wire winding 14 winds the commutator 13, forming a fixed locking structure. The problem of the enameled wire winding 14 being loosed or broken due to the armature 1's high-speed rotation is prevented, thereby enhancing the motor's robustness and operational life.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. An armature for a permanent magnet brushed motor, comprising a shaft, a plurality of silicon steel laminations circumferentially around a middle section of the shaft, a commutator configured adjacent to an end of the shaft, and an enameled wire winding wound around the silicon steel laminations and the commutator; characterized in that the armature further comprises a plastic sleeve capable of withstanding high temperature disposed between the commutator and the silicon steel laminations and adjacent to the commutator; and a plastic member wrapping around where the enameled wire winding winds the commutator, and fixedly attaching to the plastic sleeve;

wherein the plastic member establishes at least a first point of attachment to where the enameled wire winding winds the commutator, and a second point of attachment to the plastic sleeve.

2. The armature according to claim 1, further comprising two insulating sleeves capable of withstanding high temperature mounted to the two ends of the silicon steel laminations, respectively.

3. The armature according to claim 1, wherein the plastic member is made of epoxy resin.

4. The armature according to claim 1, wherein the plastic member is made of silicone.

* * * * *